June 18, 1957  J. THOMSON  2,796,167
ENDLESS BELT CONVEYORS
Filed Aug. 4, 1954  5 Sheets-Sheet 2
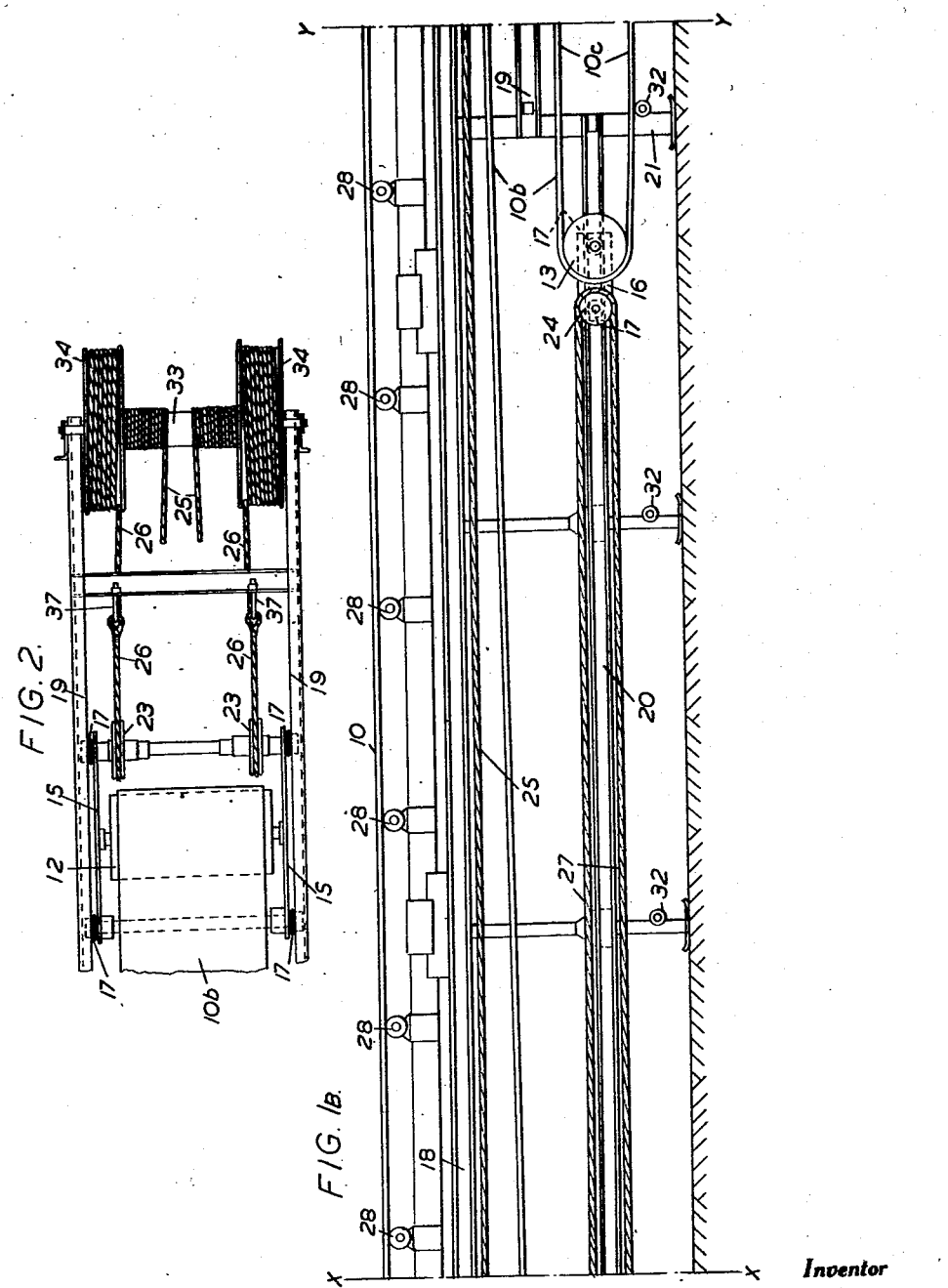
Inventor
James Thomson
By
his Attorneys

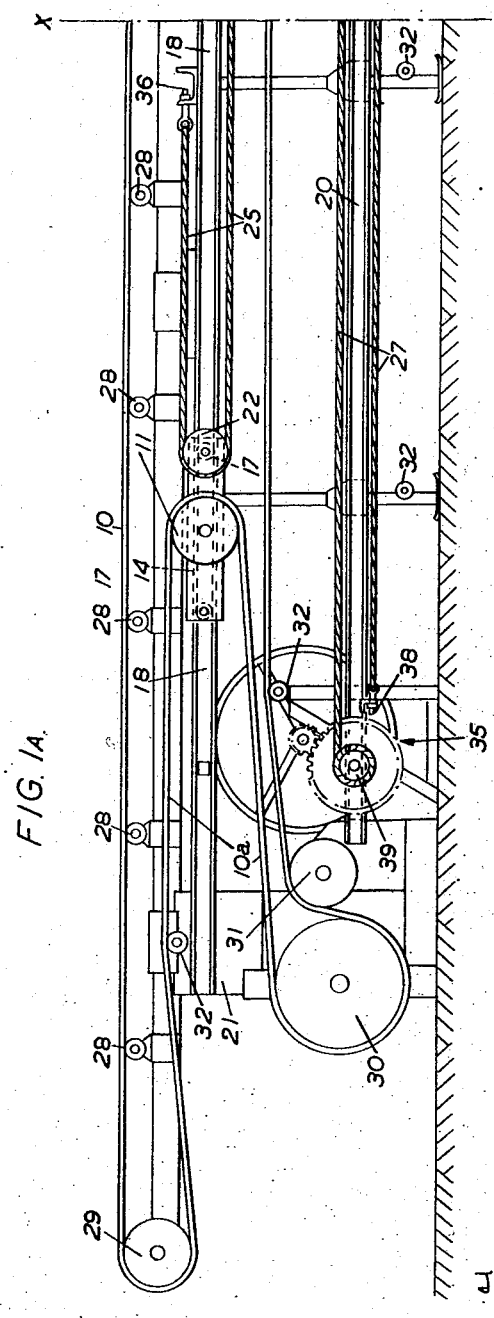

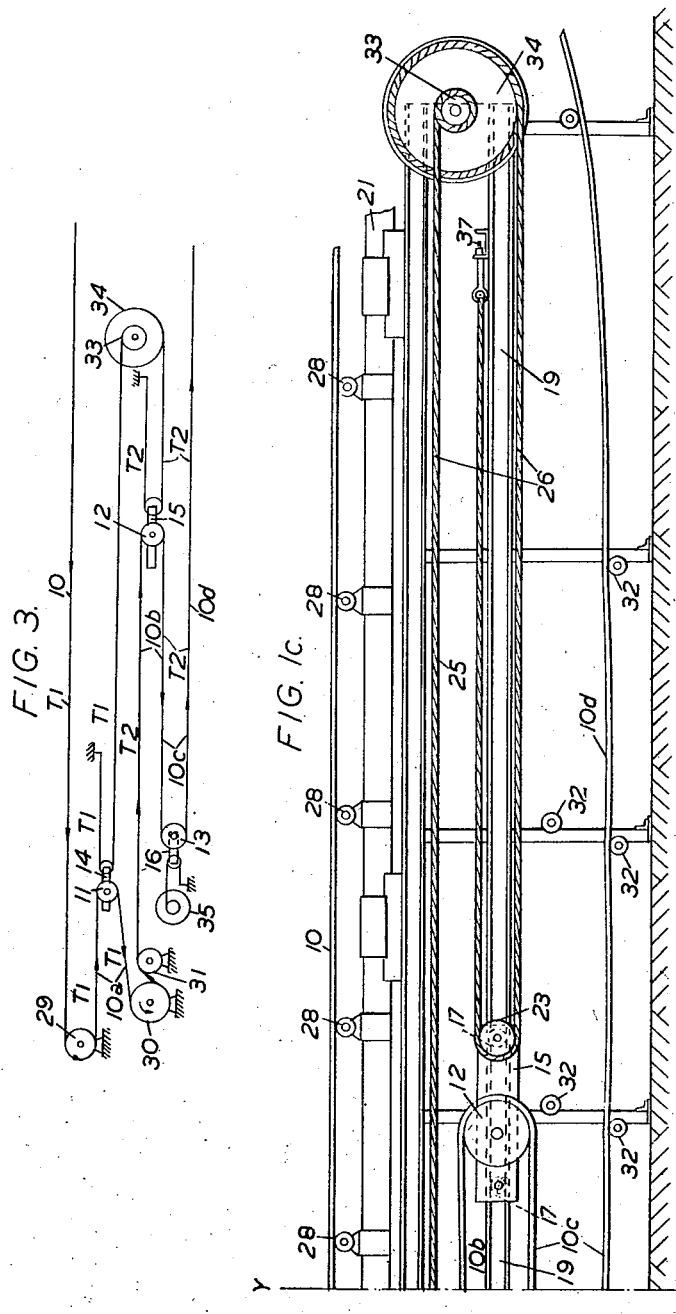

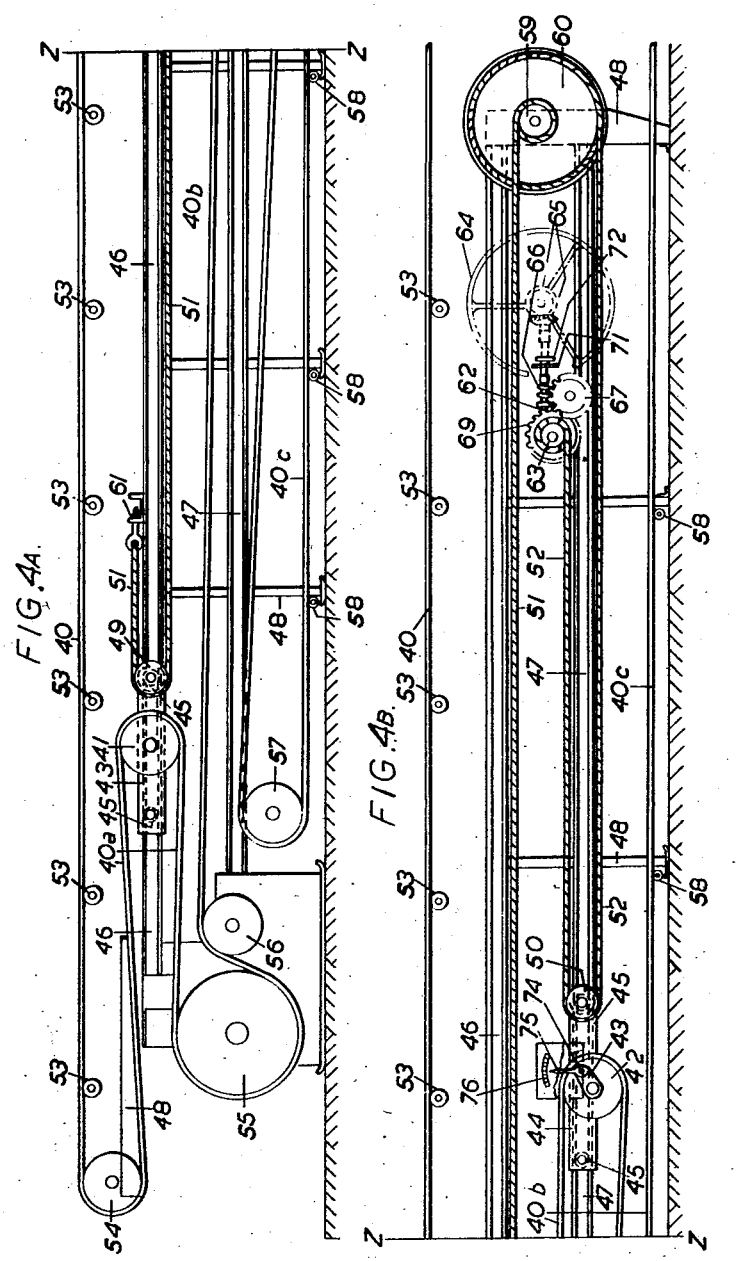

June 18, 1957 J. THOMSON 2,796,167
ENDLESS BELT CONVEYORS
Filed Aug. 4, 1954 5 Sheets-Sheet 5
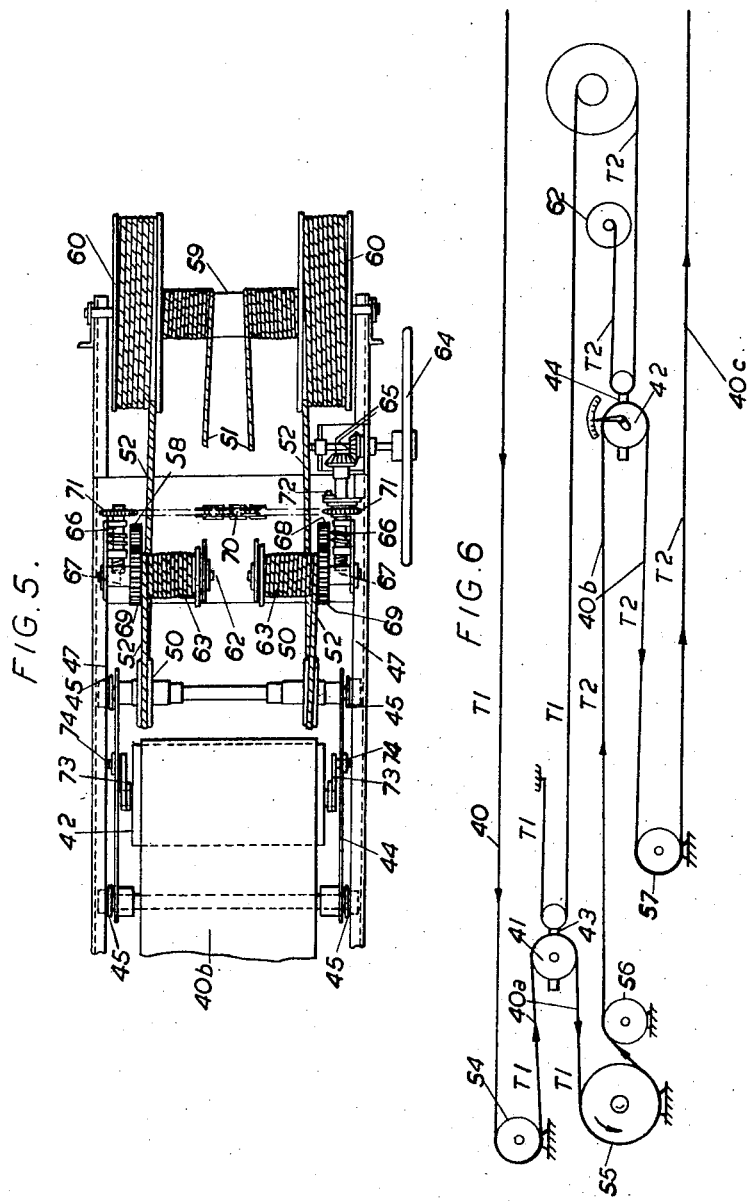
Inventor
James Thomson
By
Richardson, David and Nordon
his Attorneys United States Patent Office 2,796,167
Patented June 18, 1957

2,796,167

ENDLESS BELT CONVEYORS

James Thomson, Glasgow, Scotland, assignor to Mavor & Coulson Limited, Glasgow, Scotland Application August 4, 1954, Serial No. 447,745

7 Claims. (Cl. 198—203)

This invention relates to conveyors of the endless belt type having a conveying, or working run and a return run and incorporating a driving gear applied to the return run.

In conveyors of the type stated problems arise in maintaining the lower tension (usually termed tension T2) of the belt in appropriate relation to that of the higher tension (usually termed T1) of the belt under load. With a view to solving these problems it has been proposed hitherto to make provision whereby the tension in a belt-tensioning loop of the return run travelling to the driving gear is caused to maintain a second belt-tensioning loop in the return run travelling from the driving gear, the arrangement being such that the first loop varies in tension with increase or decrease of load on the belt and such variation causes a proportionate increase or decrease in the second loop. These two loops on opposite sides of the driving gear are connected by motion-multiplying gear such that, say, shortening of the first loop under increased belt pull causes lengthening of the other loop to an amplified degree.

The object of the present invention is to combine in a conveyor having belt-tensioning loops as aforesaid means providing ample but compact accommodation for storing a substantial length of belt, by virtue of which provision the overall length of the conveyor can be substantially increased or decreased without need for adding or removing a stretch of belt.

Therefore, the invention comprises an endless belt conveyor of the type stated having a driving gear and an assembly of pulleys all co-operating to form the belt into extensible and contractible loops, namely two belt-tensioning loops under higher and lower tensions, respectively, and extending from opposite sides of the driving gear, an automatic motion-multiplying gear pulling both loops to maintain them under the appropriate tension relationship, a manually controlled take-up gear applied in co-operation with the motion-multiplying gear to one of said loops, and an additional pulley serving to form a third loop the length of which is under the control of said take-up gear.

The first of two loops serve as an automatic means of maintaining a regulated relationship between the higher and lower tensions of the belt at opposite sides of the driving gear, and the third loop provides an adequate but compact storage for a substantial length of belt produced by shortening the conveyor or available for lengthening it.

The conveyor may have an assembly of three pulleys each movable lengthwise of the conveyor and all co-operating to form the belt into the two extensible and contractible loops, and the third loop extends from one of said first two loops under the oppositely directed pull of the manually controlled take-up gear.

Alternatively, the conveyor may have an assembly of two belt pulleys each movable lengthwise of the conveyor and both co-operating to form the belt into the extensible and contractible belt-tensioning loops at opposite sides of the driving gear and both extending under the pulls on their loop-forming pulleys of the automatic motion-multiplying gear, and a connection between said gear and one of said loop-forming pulleys, the manually controlled take-up gear being adapted to adjust the length of said connection.

Examples of an endless belt conveyor according to the invention are shown in the accompanying drawings, in which:

Figs. 1A, 1B and 1C together comprise a sectional side elevation of that portion of a conveyor which embraces the invention, the conveyor details for simplicity and clarity being shown diagrammatically and the views being divided from one another at the planes X—X and Y—Y respectively. Fig. 2 is a plan, to a larger scale than Figs. 1A, 1B and 1C, of a manually controlled take-up gear and associated parts of the conveyor. Fig. 3 is a simple diagram of the portion of the conveyor shown in Figs. 1A, 1B and 1C.

Figs. 4A and 4B together comprise a sectional side elevation of an alternative example of the conveyor, details for simplicity and clarity being shown diagrammatically and the views being divided from one another by the plane Z—Z. Fig. 5 is a plan, to a larger scale than Figs. 4A and 4B, of part of the conveyor. Fig. 6 is a simple diagram of the conveyor.

In the example according to Figs. 1A to 3, the conveyor is designed to convey material either uphill, or horizontally (as shown in the drawings) or slightly downhill; that is to say, the design is such that when the conveyor is fully loaded, the driving gear operates to drive the working run (not to be driven thereby as in steep downhill conveyance).

Referring to Figs. 1A, 1B and 1C the upper working run 10 of the endless belt travels towards the left and the belt-tensioning loops 10a and 10b together with the storage loop 10c, are formed at the left hand end of the return run of the belt. The loop 10c merges into the main low-level return stretch 10d.

The three loop-forming pulleys 11, 12 and 13 are journalled respectively in carriages 14, 15 and 16 mounted on rollers 17 which are guided by longitudinal rails 18, 19 and 20 forming runways on both sides of the conveyors frame 21. These carriages 14, 15 and 16 are provided with pulleys 22, 23 and 24, respectively, and these auxiliary pulleys are looped by cables 25, 26 and 27 constituting connections through which tension is applied to the loops 10a, 10b and 10c, respectively. Each of these cables is anchored to means hereinafter described. Thus, each cable is subject to a tension equal to only half the pull exerted through it on the associated carriage.

The working run 10 of the conveyor belt is supported by idler rollers 28 and stretches to the left to and around the customary terminal pulley 29 whence the return run of the conveyor belt passes over firstly the pulley 11 journalled in the first carriage 14, secondly around the drum 30 of the driving gear and its associated guide pulley 31, thirdly around the pulley 12 journalled in the second carriage 15 and fourthly around the pulley 13 journalled in the third carriage 16, after which the return run 10d stretches away towards the terminal pulley (not shown) at the remote right-hand end of the conveyor. The pulleys 11 and 12 journalled in the first and second carriages 14 and 15 respectively form the belt-tensioning loops 10a and 10b which both extend towards the right; and the pulley 12 co-operates with the pulley 13 journalled in the third carriage 16 to form the storage loop 10c extending towards the left. The loops 10a and 10b are on the incoming and outgoing sides of the driving gear respectively.

Idler rollers 32 are provided on the conveyor for supporting the return run of the belt. The motion-magnifying gear consists of differential pulleys 33 and 34, the smaller of which (33) is connected with the auxiliary pulley 22 on the carriage 14 associated with the loop 10a, and the larger of the differential pulleys (34) is connected to the auxiliary pulley 23 on the carriage 15 associated with the loop 10b. The differential-pulley gear is located beyond the right hand limit of the zone in which the carriage 14, 15 and 16 work. Thus, the cables 25 and 26 connecting differential pulleys both extend from the associated auxiliary pulleys 22 and 23 in the same direction, namely towards the right.

The carriage 16 is arranged to work in the space between the driving gear and the carriage 15 associated with the loop 10b at the outgoing side, and the cable 27 extends towards the left from the carriage 16 to a manually operable winch gear 35. The cables 25, 26 and 27 are anchored respectively to fixtures 36, 37 and 38 on the conveyor frame.

It will be manifest that, although the winch gear is provided primarily as a manually controlled take-up gear, it also can be utilised as a manually controlled belt-tensioning means.

In the foregoing, in describing the auxiliary pulleys 22, 23 and 24 the differential pulleys 33 and 34 and the winch gear 35, reference has been made in each instance to single connecting cables 25, 26 and 27. In practice, however, each connection consists of two side cables. Thus, the carriage 14, 15 and 16 each have two side auxiliary pulleys 22, 23 and 24 respectively, the differential pulley gear has two larger pulleys 34 and a double smaller pulley 33 and the winch gear 35 also has two pulleys 39. This duplex arrangement which, is shown in Fig. 2, is provided in order that both sides of the conveyor belt will be equally tensioned. Moreover, the winch gear 35 incorporates mechanism not shown (being known in this art) whereby one, or either, of its two pulleys 39 can be turned relatively to the other in order that the tension of the cable connections at both sides can be equalised.

In Fig. 2, which is a plan of that part of the conveyor which embraces the differential pulleys 33 and 34, there is shown the carriage 15, with its loop-forming pulley 12 and auxiliary pulleys 23, approximately at its extreme right-hand position on the runways 19. It will be manifest that the two belt-tensioning loops 10a and 10b act on the differential pulley gear 33, 34 in such a manner that this gear automatically maintains a predetermined tension relationship between the incoming and outgoing stretches of the return run. That is to say, the differential pulley gear serves automatically to maintain constant the ratio T1 to T2. Moreover, the pulley 12 of the second carriage 15 combines with the pulley 13 of the third carriage 16 to provide a take-up loop 10c the length of which is controlled by the manually operable winch gear 35, by means of which the person in charge can maintain the magnitude of T1, and therefore of T2 also, at any selected value.

In addition to the belt pulleys on the movable carriage, there are no other loop-forming pulleys except those of an associated with the driving gear and the conveyor terminals.

The combination of belt-tensioning and take-up loops and the gears driving the belt and controlling the loop-forming pulleys lends itself to embodiment in a compact arrangement. In the example described above, the driving gear is located at ground level at the left hand end of the combination, and the winch gear 35 is arranged close to the righthand side of the driving gear 30. The parts of the runways 18 in which the carriage 14 moves are short and extend from above the driving gear to the right just below the upper working run 10 of the belt. The runways 19 of the carriage 15 are comparatively long and extend at a lower level than the runways 18 to the left from the differential-pulley gear 33, 34 which is located at the right hand end of the combination. The runways 20 of the carriage 16 are also comparatively lower and extend, at a still lower level, substantially between the zones in which the carriage 14 and 15 work and just above the main return stretch 10d.

With reference now to the alternative example according to Figs. 4A to Fig. 6, here again the conveyor illustrated is designed to convey material either uphill, or horizontally (as shown in the drawings) or slightly downhill; that is to say, the design is such that, when the conveyor is fully loaded, the driving gear operates to drive the working run (not to be driven thereby as in steep downhill conveyance).

Referring to Figs. 4A and 4B the upper working run 40 of the endless belt travels towards the left and the belt-tensioning loops 40a and 40b are formed at the left-hand end of the return run of the belt, the loop 40b merging into the final low level main stretch 40c of the return run.

The two loop-forming pulleys 41 and 42 are individually journalled respectively in carriages 43 and 44 mounted on rollers 45 which are guided by longitudinal runways, respectively 46 and 47, on both sides of the conveyor frame 48. These carriages 43 and 44 are provided with auxiliary pulleys 49 and 50 respectively and these two auxiliary pulleys are looped by cables 51 and 52 constituting connections through which tension is applied to the tensioning loops. Each of these cables is anchored to means hereinafter described. Thus, each cable is subjected to a tension equal to only half the pull exerted through it on the associated carriage.

The working run 40 of the conveyor belt is supported by idler rollers 53 and stretches to the left to and around the customary terminal pulley 54 whereupon the return run of the conveyor belt passes over the pulley 41 journalled in a first carriage 43, secondly around the drum 55 of the driving gear and its associated guide pulley 56, thirdly around the pulley 42 journalled in the second carriage 44 and fourthly around a pulley 57 journalled in a stationary location on the conveyor frame, after which the return run stretches at 40c away towards the terminal pulley (not shown) at the remote right-hand end of the conveyor. The pulleys 41 and 42 journalled in the two carriages respectively form the belt-tensioning loops 40a and 40b which both extend towards the right, these loops 40a and 40b being on the incoming and outgoing sides respectively of the driving gear. Idler rollers 58 are provided on the conveyor for supporting the return run of the belt. The motion-magnifying gear consists of differential pulleys 59 and 60, the smaller of which (59) is connected with the auxiliary pulley 49 on the carriage 43 associated with the loop 40a, and the larger of the differential pulleys (60) is connected to the auxiliary pulley 50 on the carriage 44 associated with the loop 40b. The differential-pulley gear is located beyond the right hand limit of the zone in which the carriages 43 and 44 work. Thus, the cables 51 and 52 connecting the differential pulleys both extend from the associated auxiliary pulleys 49 and 50, in the same direction, namely towards the right.

The cable 51 associated with the incoming-side carriage 43 is anchored to a fixture 61 on the conveyor frame, and the cable 52 associated with the outgoing-side carriage 44 is anchored to a manually operable winch gear 62 having a stationary mounting.

As in the previous example, and as shown in Fig. 5, the various cable pulleys form a duplex arrangement so that both sides of the conveyor belt will be equally tensioned.

Referring to Figs. 4B and 5, the winch gear 62 comprises an operating hand wheel 64 which drives the winch pulleys 63 through the medium of the bevel gears 65 and, at each side of the conveyor, worms 66, worm wheels 67 and gear wheels 68, 69. The worms 66 are inter-connected by means of a driving chain 70 and sprocket wheels 71, one of the last-mentioned being mounted on each of the two worm shafts so that normally on operation of the winch gear the worms 66 act together to turn the winch pulleys 63 in unison with each other.

The winch gear, however, incorporates a clutch 72 inter-connecting the worm 66 and sprocket wheel 71 located on the side of the conveyor adjacent the hand wheel 64, whereby one of the two winch pulleys 63 can be turned relatively to the other in order that the tension of the cables 52 at both sides can be equalised, so that the associated carriage 44 will be correctly aligned in relation to its runway 47.

Moreover, the worms 66 and their associated worm wheels 67 constitute non-reactive gearing which, following manual operation in either direction, is self-locked against operation by the reactive pull of the cables 52 on the winch pulleys 63.

The loop-forming pulley 42 is journalled in the carriage 44 by having its journals carried in levers 73, one on each side of the conveyor, these levers in turn having their fulcrums 74 mounted on the carriage (see Figs. 4B and 5). Attached to one of the levers 73, at its fulcrum, is a pointer 75 co-operative with a stationary scale 76 attached to the carriage 44 (see Fig. 4B). This arrangement is such that the pulley 42, under the influence of its own weight, tends to swing downwardly to the right against the belt tension in the loop 40b, and thereby the pointer 75 indicates on the scale 76 a measure of the magnitude of this belt tension in accordance with the position occupied by the pulley 42.

From the foregoing it will be manifest that the pulley 42 of the second carriage 44 combines with the stationarily located pulley 57 to utilize the second belt-tensioning loop 40b as a long take-up storage loop the length of which is controlled by the manually operable winch gear, by means of which the person in charge can maintain the magnitude of $T_2$ and therefore of $T_1$ also (by virtue of the automatic action of the differential pulley gear) at any selected value as indicated by the pointer 75 on the scale 76.

The combination of belt-tensioning loops and the gears driving the belt and controlling the loop-forming pulleys lends itself to embodiment in a compact arrangement. In the example described above, the driving gear is located at ground level at the left hand end of the combination, the differential pulley gear is located at an upper level at the right hand end and the winch gear is arranged close to the left hand side of the differential pulley gear.

Preferably, in each of the two examples described, the conveyor is equipped with a restraining stop to come into action, whenever the conveyor is stationary in order to maintain appropriate tensions in the cables 25, 26, or 51, 52 connected to the differential-pulley-gear to facilitate re-starting. Such a stop may take the form of a buffer (not shown in the drawings) for the carriage 14 or 43, the buffer serving to prevent the differential pulley gear from unwinding excessively when not subjected to adequate load; that is to say, when the conveyor extends level, or when the conveyor extends uphill and carries no material, and the conveyor is stationary.

In each example, as aforesaid, the invention has been described as applied to a conveyor for uphill, horizontal or slightly downhill conveyance. In any case where the conveyor is designed for steep downhill conveyance, in which event the driving gear is driven by the conveyor load under heavy load conditions, the differential-pulley connections and other components of the belt-tensioning gear in general are re-arranged in accordance with these different load conditions. Moreover, as is customary, a regenerative electric motor would ordinarily be incorporated in the driving gear so that the machine would function under heavy load conditions as an electricity generator serving as an automatic brake against the downhill action of the load being conveyed.

I claim:

1. A conveyor of the endless belt type having a working run, a return run and a driving gear applied to the return run, the return run comprising ingoing and outgoing belt stretches at opposite sides of the driving gear and therefore under different belt tensions, a motion-magnifying gear spaced from the driving gear, a manually controlled take-up gear, upper and lower longitudinal runways extending between the driving gear and the motion-magnifying gear, a first carriage on one of said runways, a second carriage on the other runway, first and second belt pulleys journalled on the respective carriages and applicable to the return run of the belt to form therein extensible and contractible belt-tensioning loops respectively in the differently tensioned ingoing and outgoing stretches at opposite sides of the driving gear, first and second side cable pulleys journalled on the carriages, side cables trained round the first cable pulleys, being anchored at one end and attached at the other end to the motion-multiplying gear, and side cables trained round the second cable pulleys, being attached at one end to the motion-multiplying gear and at the other end to the manually controlled take-up gear, the arrangement being such that the first carriage acts through the motion-magnifying gear on the second carriage in co-operation with the take-up gear to utilize the associated belt loop as both a belt-tensioning and a belt storage loop.

2. A conveyor according to claim 1 in which the motion-multiplying gear is a differential pulley gear comprising small diameter and large diameter side cable pulleys having connections with the side cable pulleys of the respective carriages, these connections being wound in opposite directions on the respective differential pulleys.

3. A conveyor according to claim 1 in which the outgoing stretch is under lower tension than the ingoing stretch and in which the motion-magnifying gear is applied to the side cables of the second carriage so that a movement of the first carriage along its runway automatically effects through said gear a greater movement of the second pulley assembly.

4. A conveyor according to claim 1 in which the take-up gear is a winch comprising co-axial side drums for winding or unwinding the side cables of the associated carriage and in which said side drums are co-axial, being rotatable through separate non-reactive gearings, and in which the winch includes a single handwheel, an operative connection from said handwheel to both gearings for operating both drums in unison, and a clutch device for disconnecting one of said gearings from the handwheel so that one side drum can be rotated while the other is stationary.

5. A conveyor of the endless belt type having a working run, a return run and a driving gear applied to the return run, the return run comprising ingoing and outgoing belt stretches at opposite sides of the driving gear and therefore under different belt tensions, said conveyor also having in combination a first pulley assembly and a second pulley assembly each movable lengthwise of the conveyor, the first pulley forming a loop in the ingoing stretch and the second pulley being arranged to form a long belt-storage loop in the outgoing stretch, side cables applied to the respective pulley assemblies to pull them into the correct positional relationship, an automatic motion-multiplying gear for simultaneously winding and unwinding the side cables of the respective pulley assemblies, said gear being devised to cause the second pulley assembly, whenever the first pulley assembly moves lengthwise under varying belt tension, to move to a different extent lengthwise, and a manually controlled winch including rotatable side drums for winding or unwinding the side cables of one of said pulley assemblies, so that this assembly is under the joint controls of said winch and said motion multiplying gear.

6. A conveyor according to claim 3 in which the outgoing stretch is under lower tension than the ingoing stretch and in which the motion-multiplying gear is applied to the second pulley assembly so that a lengthwise movement of the first pulley assembly automatically effects through said gear a greater lengthwise movement of the second pulley assembly.

7. A conveyor according to claim 3 in which the side drums of the winch are co-axial, being rotatable through separate non-reactive gearings, and in which the winch includes a single handwheel, an operative connection from said handwheel to both gearings for operating both drums in unison, and a clutch device for disconnecting one of said gearings from the handwheel so that one side drum can be rotated while the other is stationary.

References Cited in the file of this patent

UNITED STATES PATENTS

| | | |
|---|---|---|
| 2,436,657 | McCulloch | Feb. 24, 1948 |
| 2,640,582 | Madeira | June 2, 1953 |